United States Patent [19]

Holmes, Jr.

[11] Patent Number: 4,458,784

[45] Date of Patent: Jul. 10, 1984

[54] BODY SUPPORT

[76] Inventor: Walter J. Holmes, Jr., 705 SE. 58th Ave., Portland, Oreg. 97215

[21] Appl. No.: 303,403

[22] Filed: Sep. 18, 1981

[51] Int. Cl.³ .............................................. A01B 8/00
[52] U.S. Cl. ........................................ 182/230; 182/129
[58] Field of Search ................... 182/230, 15, 17, 129; 248/346, DIG. 10; 135/65, 67

[56] References Cited

U.S. PATENT DOCUMENTS

| | | | |
|---|---|---|---|
| 1,795,630 | 3/1931 | Wilson | 248/346 |
| 2,738,200 | 3/1956 | De Haven | 280/35.5 |
| 2,969,123 | 1/1961 | Jamerson | 182/17 |
| 3,037,570 | 6/1962 | Olson | 180/6.5 |
| 3,119,588 | 1/1964 | Keats | 248/DIG. 10 |
| 3,172,679 | 3/1965 | Bandini | 280/32.5 |
| 3,361,224 | 1/1968 | McKim | 180/65 |
| 3,499,502 | 3/1970 | Rosander | 182/230 |
| 3,614,120 | 10/1971 | Cicero | 280/32.5 |
| 3,633,967 | 1/1972 | Timmins | 135/65 |
| 3,716,234 | 2/1973 | Lancellotti | 248/346 |
| 3,841,631 | 10/1974 | Dolan | 248/DIG. 10 |
| 4,130,263 | 12/1978 | Roericht | 248/346 |

FOREIGN PATENT DOCUMENTS

| | | | |
|---|---|---|---|
| 1105324 | 11/1955 | France | 135/67 |
| 1166991 | 11/1958 | France | 135/67 |

Primary Examiner—R. P. Machado
Assistant Examiner—Alvin Chin-Shue
Attorney, Agent, or Firm—Glen A. Collett

[57] ABSTRACT

A body support for use in berry picking, garden weeding and the like for supporting the weight of a person's upper torso when in a kneeling or stooping position. The support includes a ground engaging foot, an elongated support member mounted on the foot, and a chest-supporting rest mounted on the upper end of the support member.

11 Claims, 8 Drawing Figures

U.S. Patent  Jul. 10, 1984  4,458,784
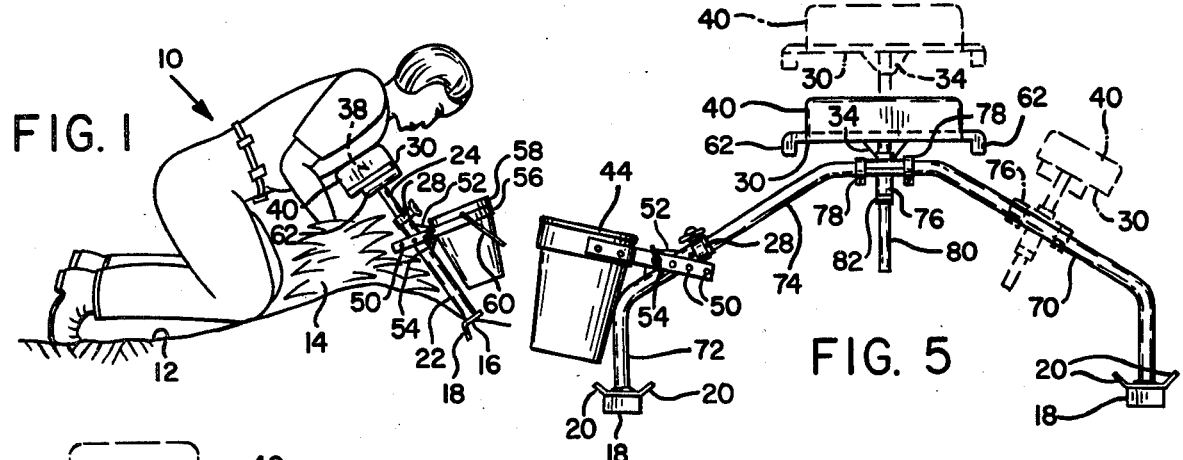
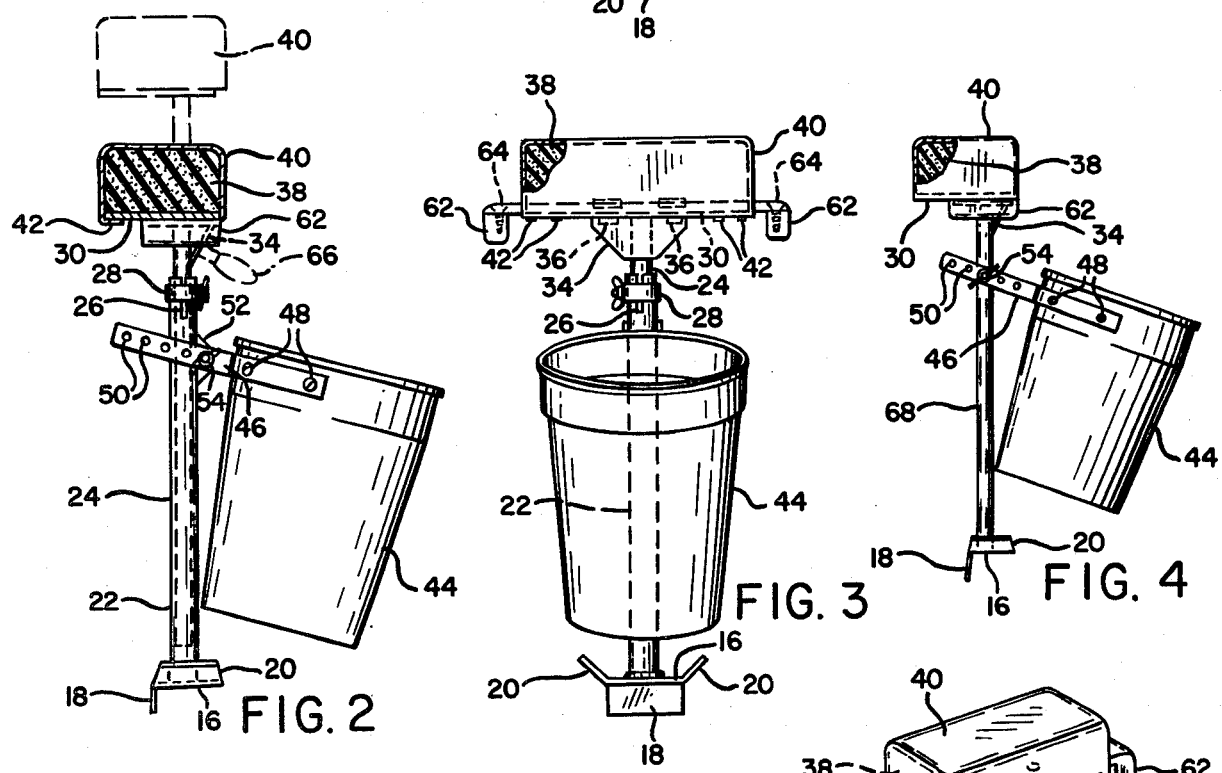
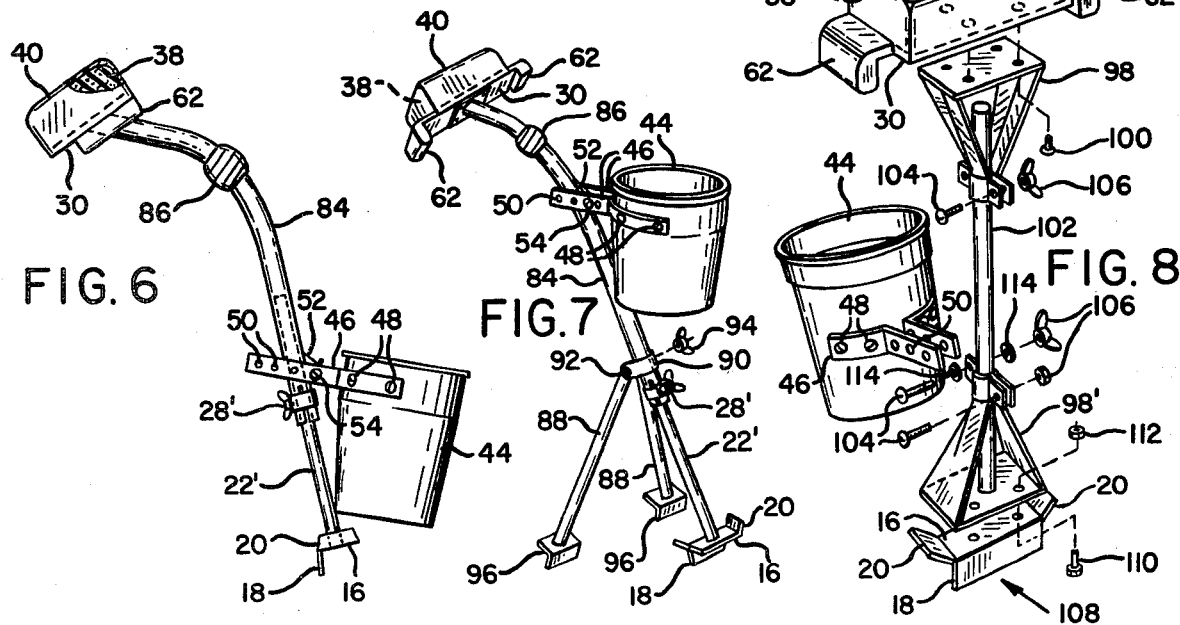

BODY SUPPORT

BACKGROUND OF THE INVENTION

This invention relates to a gardener's or berry picker's aid, and in particular to a body support for supporting the weight of a person's upper torso when in a kneeling or stooping position.

Many kinds of produce do not readily lend themselves to automated harvesting and accordingly are commonly picked by field workers by hand. Much of this work is done close to the ground and requires the worker to kneel or stoop in order to reach the produce. Strawberries, in particular, are normally picked in this manner either by commercial workers or by do-it-yourself pickers.

This stooping position which must be assumed by the workers causes severe stress in a person's back. It can be extremely detrimental when continued for weeks of sustained field work. But it is also quite tiring for the occasional picker after just a few hours.

Garden weeding or any other activity which requires that a person work close to the ground or floor involves a similar kneeling or stooping position, and is likewise stressful to the person's back.

Previously, wheeled vehicles having a bed on which a field worker or workers could lie have been used for produce harvesting. Such machines are cumbersome, and are very expensive in relation to the amount of work which can be accomplished with them.

Accordingly, it is the general object of the present invention to provide a body support for use in berry picking, garden weeding and the like for supporting the weight of a person's upper torso when in a kneeling or stooping position to reduce the stress on the person's back.

Another object is to provide a support which is comfortable and easy to use.

A further object is to provide a device which is inexpensive and simple in construction.

Another object is to provide a support which mounts a container for receiving the produce.

Yet another object is to provide a support which is adjustable for various height individuals.

A still further object is to provide a foot for the support which is substantial on various hard or soft surfaces.

These and other objects and advantages of the present invention and the manner in which they are achieved will be made apparent in the following specification and claims.

SUMMARY OF THE INVENTION

In its basic concept the present invention is a body support for supporting the weight of a person's upper torso. A ground engaging foot mounts a support member, which in turn mounts a chest-supporting rest.

BRIEF DESCRIPTION OF THE DRAWINGS

FIG. 1 is a pictorial elevation of a person using the body support of the present invention.

FIG. 2 is a side elevation of the body support of FIG. 1.

FIG. 3 is a front elevation of the body support of FIG. 1.

FIG. 4 is a side elevation of a second embodiment of the present invention.

FIG. 5 is an elevation of a third embodiment of the present invention.

FIG. 6 is a side elevation of a fourth embodiment of the present invention.

FIG. 7 is a top perspective view of the body support of FIG. 6.

FIG. 8 is an exploded top perspective of a fifth embodiment of the present invention.

DESCRIPTION OF THE PREFERRED EMBODIMENTS

As shown in FIG. 1 the body support of the present invention is used by a person 10 when in a stooping position, for instance when kneeling on the ground 12 as illustrated. The device is useful for produce harvesting such as picking strawberries 14, as well as a number of other tasks where work close to the ground or floor is required.

The first embodiment of the present invention is illustrated in further detail in FIGS. 2 and 3. A ground engaging foot includes a base plate 16, a downwardly extending blade 18 attached to one edge of the base plate, and a pair of upwardly and outwardly extending wings 20 attached to the side edges of the base plate.

A support member is mounted on the foot and is upstanding therefrom. The support member includes a lower shank 22 attached substantially perpendicularly to base plate 16 of the foot. An upper shank 24 is nestable in the lower shank and may be moved longitudinally or telescoped with respect to the lower shank for adjustment to various heights. Means for releasably securing the shanks against relative movement is provided. Lower shank 22 is slotted at its top 26, and a compression band and screw unit 28 is operable to squeeze the slotted top of the lower shank tightly against upper shank 24 forming a frictional lock.

Upper shank 24 mounts a rest which is configured and dimensioned to comfortably support the weight of a person's upper torso. The rest includes a plate 30 attached to the upper shank and dimensioned to substantially span the width of the user's chest. The plate is preferably mounted by a brace 34 and attached by screws 36. A cushion is mounted on the plate and includes a resilient pad 38 and a cover 40 attached to the plate by tacks 42.

A bucket 44 is mounted on the support member by bracket 46. Bolts 48 attach the bracket to the bucket. The bracket preferably has several holes 50 along its length to provide adjustment as the user desires. A loop of metal 52 is attached to lower shank 22. A bolt and wing nut 54 through the loop and one of holes 50 mount the bucket on the support member.

FIG. 1 illustrates a variation of the bucket attachment means. A bracket 56 forms a circular loop in which a conventional bucket 58 having a bail 60 is loosely placed.

Handles 62 are provided for easy manipulation of the device, and so that the user may lift himself off the support and to his feet. The handles are attached to plate 30 by screws 64 (FIG. 3). An auxiliary handle 66 may also be provided, attached to brace 34.

FIG. 4 illustrates a simpler version of the body support in a second embodiment. A single shank 68 mounts the foot and the rest. No adjustment is provided for height. Because there are no nestable shanks as with the first embodiment, bracket 46 mounting bucket 44 may be attached by simply bolting it directly to shank 68.

FIG. 5 illustrates a third embodiment of the body support having two legs to straddle a row. First and second support members are provided, and preferably both are configured substantially similarly. The first support member includes shank 70 attached to a first foot, and mounting the rest. The second support member includes a lower shank 72 and a nestable upper shank 74. The lower shank is attached to a second foot, and the upper shank also supports the rest. Upper shank 74 may be formed as a continuation of shank 70. The support members mount a bracket 76 secured by two compression bands 78. The bracket in turn mounts a support rod 80 which is adjustable in height and secured by compression band 82. Support rod 80 mounts the rest. The support members thus arranged are spaced apart as illustrated to straddle a row. An alternate position of the rest is also illustrated and bracket 76 may be secured in this position to mount the rest.

A fourth embodiment of the body support is illustrated in FIGS. 6 and 7. A curved upper shank 84 allows the support member to arch over a row. Such a design facilitates picking produce when the plants are large and dense. An auxiliary handle 86 such as may be made by wrapped tape on the curved shank may be provided. The rest is mounted at an angle to the shank. Curved upper shank 84 nests lower shank 22' and is secured by compression band 28'. The remainder of the structure is similar to that of the first embodiment.

FIG. 7 illustrates the use of a pair of auxiliary legs 88 to convert the support into a tripod stand. The spaced-apart legs are mounted by a bracket 90, and secured by bolt 92 and wing nut 94. Feet 96 are provided at the lower end of legs 88.

FIG. 8 illustrates the body support in a fifth embodiment. The chest supporting rest, previously discussed in relation to FIGS. 2 and 3, is mounted on a bracket 98 by screws 100. The bracket clamps to a shank 102, which may be a wooden dowel approximately one inch in diameter. A similar bracket 98' is mounted on the bottom end of shank 102. The brackets are secured by bolts 104 and wing nuts 106 which clamp the brackets tightly to the shank. The length of the assembly may be adjusted as desired. A foot 108 is attached to the lower bracket 98' by bolts 110 and nuts 112. Bucket 44 is attached to the assembly by use of one of the bracket clamp bolts 104. Spacers 114 adjust for the width of bracket 46 around shank 102. Because the bucket is mounted closer to the ground bracket 46 is mounted lower on bucket 44.

OPERATION

The use of the body support of the present invention is illustrated substantially in FIG. 1. It may be used in any manner comfortable for the user. Preferred positions include placement against the chest, the abdomen, or under one arm. Either a standing or a kneeling position is accommodated.

The user may desire to rock from side to side while picking to extend his reach. Wings 20 on the foot engage the ground and support the device as it leans. Blade 18 digs into the ground and prevents the foot from slipping.

Bucket 44 provides a ready container for produce. The contents of the bucket are easily dumped by inverting the entire device. Bucket 58 (FIG. 1) is removable.

Of course, it is apparent that the body support is useful for tasks other than berry picking. Bucket 44 may be removed if it is not needed for the particular task. It will also be appreciated that the device may be used on a surface other than the ground, such as a floor. Accordingly, the term 'ground' is intended to include all such surfaces. The foregoing description and the herein referenced drawings are of the preferred embodiments, and no limitation is intended thereby. Obvious modifications may be made by those skilled in the art without departing from the spirit and scope of the invention.

I claim:

1. A body support for use in berry picking, garden weeding and the like for supporting the weight of a person's upper torso when in a kneeling or stooping position, the support comprising:
   (a) an elongated support member;
   (b) a chest-supporting rest mounted on the upper end of the support member, and being of a substantially narrow, elongated configuration, its elongated width being of a dimension to substantially span the width of the user's chest to comfortably support the weight of a person's upper torso; and
   (c) a ground engaging foot mounted on the lower end of the support member, and including a base plate attached substantially perpendicularly to the support member, and a downwardly extending blade attached to one edge of the base plate and having a width substantially equal to the base plate.

2. The body support of claim 1 wherein the foot further comprises upwardly and outwardly extending wings attached to the side edges of the base plate at such an angle as to support the body support as it leans.

3. The body support of claim 1 wherein the support member comprises a lower shank attached to the foot and an upper shank attached to the rest and means for releasably securing said shanks to prevent relative movement thereof.

4. The body support of claim 1 wherein the support member is substantially upright, and curved to arch over a row.

5. The body support of claim 1 wherein the support member comprises an elongated shank, a bracket releasably clamped to each end of the shank, and means for mounting one bracket on the rest and the other bracket on the foot.

6. The body support of claim 1 further comprising a second support member also mounting the rest, and a second foot attached to the lower end of the second support member, the two support members being spaced-apart sufficiently to straddle a row.

7. The body support of claim 1 wherein the rest comprises a plate mounted on the support member and dimensioned to substantially span the width of the user's chest and a resilient cushion attached to the plate for placement against the chest.

8. The body support of claim 1 further comprising a handle depending from each end of the rest.

9. The body support claim 1 further comprising a bucket and bracket means mounting the exterior of the bucket and mounted on the support member for mounting the bucket on the support member.

10. A body support for use in berry picking, garden weeding and the like for supporting the weight of a person's upper torso when in a kneeling or stooping position, the support comprising:
   (a) a ground engaging foot;
   (b) a chest-supporting rest, being of a substantially narrow, elongated configuration, its elongated width being of a dimension to substantially span the width of the user's chest to comfortably support the weight of a person's upper torso; and (c) a support member including an elongated shank, a bracket releasably clamped to each end of the shank, and means for mounting one bracket on the rest and the other bracket on the foot.

11. A body support for use in berry picking, garden weeding and the like for supporting the weight of a person's upper torso when in a kneeling or stooping position, the support comprising:

(a) a ground engaging foot;

(b) an elongated support member mounted on and upstanding from the foot;

(c) a chest-supporting rest mounted on the upper end of the support member, and being of a substantially narrow, elongated configuration, its elongated width being of a dimension to substantially span the width of the user's chest to comfortably support the weight of a person's upper torso;

(d) a second support member also mounting the rest; and (e) a second foot attached to the lower end of the second support member, the two support members being spaced-apart sufficiently to straddle a row.

* * * * *